United States Patent
Keishi et al.

[15] 3,661,678
[45] May 9, 1972

[54] METHOD OF PREPARING A HEAT-SENSITIVE SHEET FOR USE IN STENCIL

[72] Inventors: Kubo Keishi, Kanagawa-ken; Sakai Kiyoshi, Tokyo; Miyabe Shuichi, Chiba-ken, all of Japan

[73] Assignee: Kabushiki Kaisha Ricoh, Tokyo, Japan

[22] Filed: June 25, 1969

[21] Appl. No.: 836,286

[30] Foreign Application Priority Data

July 3, 1968 Japan.....................................43/45842

[52] U.S. Cl.............................................156/322, 156/332
[51] Int. Cl.........................................................C09j 5/00
[58] Field of Search..........................156/322, 327, 311, 332

[56] References Cited

UNITED STATES PATENTS

| | | | |
|---|---|---|---|
| 3,062,698 | 11/1962 | Aykanian | 156/311 X |
| 3,249,482 | 5/1966 | Gilfillan | 156/322 |
| 3,316,137 | 4/1967 | Wisotzky | 156/322 X |

*Primary Examiner*—Carl D. Quarforth
*Assistant Examiner*—Stephen J. Lechert, Jr.
*Attorney*—Woodhams, Blanchard and Flynn

[57] ABSTRACT

A method of preparing a heat-sensitive stencil sheet comprising the steps of; making a thermoplastic resin film consisting essentially of vinylidene chloride-vinyl chloride copolymer in contact with the surface of a heating roll having a surface temperature at 80°–110° C so as to heat the film and to move said film forward to the next step of processing, cooling said film immediately after it leaves the surface of the heating roll, and then laminating said film to a supporting sheet made of a thin sheet of porous paper by means of an interposed adhesive binder.

4 Claims, 1 Drawing Figure

Patented May 9, 1972 3,661,678
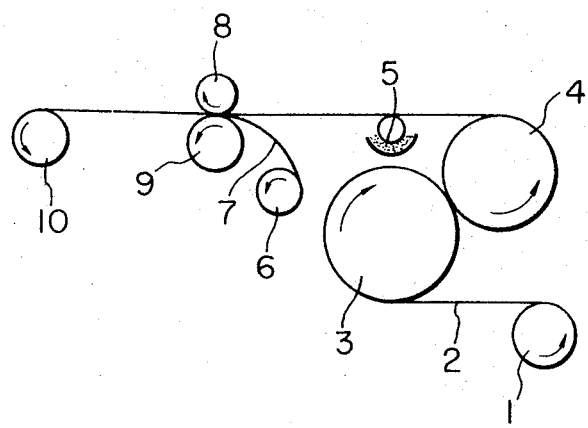
INVENTORS
KEISHI KUBO
KIYOSHI SAKAI
SHUICHI MIYABE
BY Woodhams, Blanchard & Flynn
ATTORNEYS

METHOD OF PREPARING A HEAT-SENSITIVE SHEET FOR USE IN STENCIL

BACKGROUND OF THE INVENTION

1. Field of the Invention

The present invention relates to a method of preparing a heat-sensitive stencil sheet by sticking together a thermoplastic resin film and a thin sheet of porous paper by means of an adhesive.

2. Description of the Prior Art

It is well known to prepare a heat-sensitive stencil sheet by laminating together a thermoplastic resin film which is capable of being perforated to a supporting sheet made of a thin sheet of porous paper such as a Japanese tissue paper.

When a stencil is prepared with such a heat-sensitive sheet as above described, generally an original having an image as dark as desired is overlaid upon said thermoplastic resin film and then, by radiating an infrared light onto the surface of the thin porous paper of the heat-sensitive sheet, a portion of the surface of said film corresponding to said dark image is perforated.

Since the desired portion of the thermoplastic resin film is to be perforated by heating by irradiating same with infrared light directed toward said heat-sensitive sheet, the characteristic of the thermoplastic resin film to withstand heating becomes a matter of great importance. In addition to the material of which said film, is made, the conditions under which said film was produced as well as the conditions under which said heat-sensitive sheet was prepared have a substantial influence upon the perforation characteristic of the heat-sensitive sheet.

However, in recent years thermoplastic resin film production is conducted in a mass production system so that it is easy to obtain a material of uniform quality and of uniform characteristic constantly, once the kind of thermoplastic resin film to be produced is decided, and accordingly there is no longer any important problem as concerns material and the manufacturing of the material. It is more important to be able to change the characteristics of thermoplastic resin film into those which are required for use in a heat-sensitive sheet and, further, to stick together said film to a supporting sheet without any deterioration of the characteristics. For example, U.S. Pat. No. 3,267,847 describes that, after being heated under a non-pressurized condition, the thermoplastic resin film, whose principal component is vinylidene chloride, is utilized in a heat-sensitive stencil sheet.

On the other hand, for the purpose of improving the characteristics of the thermoplastic resin film, many efforts have been exerted in a critical study of the conditions of extrusion-stretching during the manufacturing phase of said film, or in treating said film with a suitable solvent after manufacturing same.

However, when perforation is conducted for an image such as Japanese letters or ideograms, wherein the fine lines and the thick lines are intermixed with each other, utilizing a heat-sensitive sheet whose characteristics have been changed in a manner as mentioned above, there still remain drawbacks that the sharpness of the perforated image is not always satisfactory and, furthermore the prior processes of changing the characteristics of said film are not well suited to industrial processing.

SUMMARY OF THE INVENTION

An object of the present invention is to provide a method of preparing a heat-sensitive stencil sheet in an easy and simple way and particularly in a mass production system. That is; the method of the present invention is characterized by comprising the steps of moving a thermoplastic resin film consisting of vinylidene chloride-vinyl chloride copolymer in contact with the surface of a heated rotating roll having a surface temperature at 80° – 110° C so as to heat said film and to move said film forward to the next phase of processing, cooling said film immediately after it leaves the surface of the heating roll, and then sticking together said film to a supporting sheet made of a thin sheet of porous paper by means of an adhesive binder.

In the present invention, it is preferred that a thermoplastic resin film consisting of vinylidene chloride-vinyl chloride copolymer should be prepared to have a thickness of 6 – 10 microns, for example, by treating said copolymer in the inflation method. As for the thermoplastic resin film consisting of vinylidene chloride-vinyl chloride copolymer and being put on the market generally for use in lamination and having a thickness of about 20 microns, it is rather unsatisfactory not only from the view point of thickness but also from the view point of heat-sensitivity even after changing its characteristics by heating and cooling.

In the present invention, when the thickness of the film is kept within the preferred range and the material of the film is also selected to be a predetermined kind, the heat shrinkage of said film by heating same for 1 minute at 100° C, just before laminating it to a thin sheet of porous paper, is measured as being in the range of from 2.1 to 8.0 percent (by a measuring method, the same as ASTM DI 204 – 54).

This heat shrinkage has a significant relationship with the perforativity of said film and, for instance, if the heat shrinkage of the thermoplastic resin film at 100° C is far different from the stated range, a stencil prepared by perforating said film, which has been laminated to a thin sheet of porous paper, is affected as regards the sharpness as well as the resolving power of the perforated image.

The characteristics of the thermoplastic resin film are not influenced by the length of time during which said film is kept in contact with the surface of heating roll, but they are influenced really by the surface temperature of said roll. That is; when the surface temperature of the heating roll is less than 80° c or more than 110° C, the heat shrinkage of the film at 100° C is changed away from the above mentioned range of 2.1 – 8.0 percent. Therefore, the resolving power as well as the sharpness of the perforated image of a stencil prepared by using such film are deteriorated.

In addition, the cooling step of the present invention, which should be carried out immediately after the treatment by the heating roll, is preferably done by a colling roll having a surface temperature not exceeding room temperature, but there is no objection at all, if the film is cooled by blowing against the film cool air having the same temperature as that of said roll.

The cooling treatment in such a manner results at once in the fixing of the changed characteristic of the film, that is; the physical characteristic of the film, for instance heat shrinkage, is fixed within a range to make it suitable for use as a heat-sensitive stencil sheet.

A remarkable distinction of the present invention over the conventional methods used in this field is that a thermoplastic resin film prepared by the inflation method in a mass production system should be rapidly cooled immediately after being heated.

In general, a thermoplastic resin film stretched out by the inflation method or the conventional method is not so good as regards dimensional stability and accordingly even when kept at room temperature, it often changes in dimensions. Therefore, it has been a well known fact that, prior to the laminating processing, the thermoplastic resin film thus prepared should be subjected to a heat treatment so as to ensure dimensional stability. However, in the conventional heat treatment, a cooling process is often conducted very slowly after a heating process so that, during the course of being cooled, an alteration of the organization is caused and thereby the crystallization is accelerated so as to reform a new organization which is very good in so-called thermal stability, particularly in the dimensional stability.

But, if an alteration of the organization and the recrystallization are accelerated too much, the thermoplastic resin film may become not suitable for use in the present invention. It is because of this that, as apparent from the perforated structure of the heat-sensitive sheet, a film to be utilized in the present invention must have a characteristic of being softened, shrunk and then broken down at a predetermined temperature, and, on the other hand, the contractibility of a thermoplastic resin film is influenced by the amorphous portion still remaining therein.

Thus, a film treated by slow cooling just as above described, is very poor in contractibility because of the low amount of the remaining amorphous portion due to too much accelerated crystallization, while the film treated by a rapid cooling as in the present invention is very good in contractibility because of a high amount of the remaining amorphous portion so that said film is quite suitable for use in a heat-sensitive sheet.

On the other hand, there is a remarkable difference between a specific heat curve of the slowly cooled film and that of the rapidly cooled film. For instance, when treated by slow cooling, a film consisting of polyethylene terephthalatesebacate copolymer (mole ratio, 80 : 20) presents merely one melting point at about 230° C, but, when treated by a rapid cooling, said film presents a so-called low-temperature-crystallization phenomenon at the temperature of 60° C and further presents a melting point divided into two peaks.

This characteristic is exceedingly advantageous for such a heat-sensitive sheet as is utilized in the present invention. That is; in case of a letter such as Japanese letter or ideogram wherein the fine lines and the thick lines are intermixed with each other, the caloric value or the generating heat differs between the fine lined portion of the thick lined portion, and the fine lined portion generates somewhat a small quantity of heat in comparison with the thick lined portion.

Nevertheless, in accordance with the object of the present invention, it is necessary for both the fine lined and thick lined portions to be perforated equally and faithfully to the original.

In this type of processing, since the film presents two melting points as mentioned above, the lower peak is available to the fine lined portion and the higher peak to the thick lined portion for effectuating perforation.

Therefore, a thermoplastic resin film treated by a rapid cooling as in the present invention really has a large effectiveness when used in a heat-sensitive sheet.

BRIEF DESCRIPTION OF THE DRAWING

Referring now to the drawing, the following description is made for clear understanding of the present invention.

The FIGURE shows a schematic view illustrating a preferred embodiment of the present invention.

The reference numeral 1 designates a roll on which is rolled a thermoplastic resin film 2 having a thickness of 6 to 10 microns. Reference numerals 3, 4, 5, 6 and 7 designate respectively a heating roll, a cooling roll, an adhesive binder applier, a roll for a thin sheet of porous paper and the thin sheet of porous paper itself. Further, reference numerals 8 and 9 indicate pressing rolls and 10 indicates a roll for rolling up the produced heat-sensitive sheet for use in making stencils. Referring again to the figure, the heating roll 3 has a surface temperature of 80° – 110° C while the cooling roll 4 has a temperature of about 20° C, although the lower the surface temperature, the better the result, in the case of the cooling roll 4.

After being treated by heat treatment and cooling treatment, there is applied onto the surface of the thermoplastic resin film 2 an adhesive binder consisting of an organic solvent solution of polyvinylacetate by an adhesive binder applier 5.

On the other hand, from the roll 6 is rolled out a thin sheet of porous paper such as Japanese tissue paper or stencil base tissue, and then it is laminated to the thermoplastic resin film by the pressing rolls 8 and 9 so as to form a heat-sensitive sheet which is in turn rolled up on the roll 10.

Further, in the present invention, a cutter may be provided in a position just behind said pressing rolls 8 and 9 in order to cut said produced sheet to the desired dimensions.

As the result of measuring the heat shrinkage of the film after it come off the cooling roll 4 in the present invention, the following data was obtained:

| heating temperature (°C.) | duration | heat shrinkage (%) |
|---|---|---|
| 80 | one minute | 1.0 |
| 100 | one minute | 4.0 |
| 110 | one minute | 10.0 |
| 120 | one minute | 12.0 |
| 140 | one minute | 35.0 |

Such characteristics as described above are quite suitable for use in a heat-sensitive sheet. That is, upon applying an infrared light to a heat-sensitive sheet prepared in such a manner as mentioned above and being overlapped thereon with an original having the desired image, a portion of said film which underlies said original image is heated up to a temperature of 130° – 170° C and then shrinks and melts, so that there was obtained a stencil having an image perforated sharply and clearly. Then, upon printing with this stencil utilizing a mimeographic printing machine of a conventional type, prints which have a clearly reproduced image can be obtained. Further there is no deterioration of the sharpness in the reproduced image even after 2000 copies or more are made.

As aforementioned, the method of the present invention has made it possible to obtain a heat-sensitive sheet having an excellent characteristic for use in stencil at a very low cost of equipment and in a high production capacity, and furthermore it has brought an additional advantage that all the products are of uniform quality. Accordingly, the method of the present invention is considered to make a remarkable contribution to this field of industry.

DESCRIPTION OF THE PREFERRED EMBODIMENT

EXAMPLE 1

A thermoplastic resin film consisting of vinylidene chloride-vinyl chloride copolymer with thickness of 7 microns is prepared according to the inflation method. Then said film is kept in contact with the surface of a metal heating roll having diameter of 250 mm and having a surface temperature of 95° C and thereby said film is moved forward to the next step at a speed of 8 m/minute. Immediately after leaving from said roll, said film is in turn kept in contact with a metallic cooling roll of 250 mm in diameter and 20° C surface temperature and thereby said film is moved forward so as to be applied with an adhesive binder whose principal component is polyvinylacetate. Then, said film is laminated together successively to a thin sheet of porous paper (a supporting sheet for stencil) having a basis weight of 11 g/m² and afterward dried at a temperature lower than 50° C for finishing up the preparation of a heat-sensitive sheet for use in making a stencil.

After overlapping a newspaper upon the surface of a thermoplastic resin film of the heat-sensitive sheet prepared in a manner as above described, an infrared light is applied through the thin sheet of porous paper and then is obtained a stencil having an image perforated sharply. Furthermore, as the result of printing with said stencil utilizing a mimeographic printing machine, prints having a reproduction faithful to the original can be obtained in a number exceeding 2,000.

EXAMPLE 2

A thermoplastic resin film consisted of vinylidene chloride-vinyl chloride copolymer just the same as used in Example 1 is kept in contact with the surface of a metallic heating roll of 300 mm in diameter and having a surface temperature of 100° C and thereby said film is moved forward at a speed of 10 m/minute. Immediately after leaving said roll, said film is in turn kept in contact with the surface of a metallic cooling roll of 200 mm in diameter and having a surface temperature of 20° C and thereby said film is moved forward to the next step wherein said film is laminated together to a thin sheet of porous paper (a supporting sheet for stencil) having a basis weight of 10 g/m² after being applied with an adhesive binder the same as used in Example 1. After being dried at a temperature lower than 50° C, a heat-sensitive sheet for use in making a stencil is obtained.

A stencil prepared from this heat-sensitive sheet by treating in the same manner as Example 1 is confirmed to have the same capability in printing as that of Example 1.

What is claimed is:

1. A method of preparing a heat-sensitive sheet for use in making a s stencil, comprising the steps of;

moving a thermoplastic resin film consisting essentially of vinylidene chloride-vinyl chloride copolymer in contact with the surface of a rotating heating roll having a surface temperature at 80° – 110° C. so as to heat said film in order to adjust the heat shrinkage characteristics thereof and to move said film forward, cooling said film immediately after it leaves said surface of the heating roll, and then laminating together said film and a supporting sheet made of a thin sheet of porous paper by applying an adhesive binder to at least one of said film and said sheet and then joining together said film and said sheet.

2. A method according to claim 1, wherein said step of cooling is carried out by moving said film in contact with the surface of a rotating cooling roll whose surface temperature does not exceed the room temperature.

3. A method according to claim 1, wherein said step of cooling is carried out by blowing cool air against said film.

4. A method according to claim 1, wherein said adhesive binder is an organic solvent solution of polyvinylacetate.

* * * * *